United States Patent
Vogt et al.

(10) Patent No.: US 9,709,994 B2
(45) Date of Patent: Jul. 18, 2017

(54) DEVICE FOR PROVIDING A FLUID HAVING REGULATED OUTPUT PRESSURE

(71) Applicant: ASCO NUMATICS GMBH, Oelbronn-Duerrn (DE)

(72) Inventors: Martin Vogt, Oelbronn (DE); Harald Steinle, Oetisheim (DE); Felix Ams, Kaempfelbach (DE)

(73) Assignee: Asco Numatics GmbH, Oelbronn-Duerrn (DE)

( * ) Notice: Subject to any disclaimer, the term of this patent is extended or adjusted under 35 U.S.C. 154(b) by 164 days.

(21) Appl. No.: 14/663,625

(22) Filed: Mar. 20, 2015

(65) Prior Publication Data

US 2015/0268669 A1  Sep. 24, 2015

(30) Foreign Application Priority Data

Mar. 21, 2014 (EP) .................................... 14161000

(51) Int. Cl.
- *G05D 7/06* (2006.01)
- *G05D 16/06* (2006.01)
- *G05D 16/20* (2006.01)

(52) U.S. Cl.
CPC ....... *G05D 7/0635* (2013.01); *G05D 16/0672* (2013.01); *G05D 16/2053* (2013.01); *G05D 16/2093* (2013.01); *Y10T 137/261* (2015.04); *Y10T 137/7759* (2015.04); *Y10T 137/86598* (2015.04); *Y10T 137/86702* (2015.04)

(58) Field of Classification Search
CPC .............. G05D 16/185; G05D 7/0635; G05D 16/0672; G05D 16/2053; G05D 16/2093; Y10T 137/7759; Y10T 137/2544; Y10T 137/86582; Y10T 137/8659; Y10T 137/86598; Y10T 137/86606; Y10T 137/86702; Y10T 137/7794; Y10T 137/261; Y10T 137/781; Y10T 137/7811
USPC ...... 137/102, 625.6, 625.61, 625.62, 625.63, 137/625.68, 505.11, 116.5, 505.27, 137/505.28
See application file for complete search history.

(56) References Cited

U.S. PATENT DOCUMENTS

| | | | | |
|---|---|---|---|---|
| 2,806,481 A | * | 9/1957 | Faust ................... | G05D 16/163 137/116.5 |
| 2,831,494 A | * | 4/1958 | Taplin ................ | G05D 16/0619 137/116.5 |

(Continued)

FOREIGN PATENT DOCUMENTS

| FR | 2391408 | 12/1978 |
|---|---|---|
| GB | 885445 | 12/1961 |

*Primary Examiner* — William McCalister
(74) *Attorney, Agent, or Firm* — Michael J. Striker

(57) ABSTRACT

A device for providing an output fluid at a regulated output pressure includes a pressure control unit controlled via a pilot control pressure and a pilot control unit that provides the pilot control pressure. The pressure control unit includes an inlet chamber for an input fluid having an input pressure, an outlet chamber for the output fluid having the regulated output pressure and a first valve unit that acts between the inlet chamber and the outlet chamber. A first diaphragm of the pressure control unit is acted upon by the pilot control pressure. A second diaphragm, which is mechanically coupled to the first diaphragm is acted upon by the output fluid having the output pressure acts. At least the second diaphragm mechanically acts on the first valve unit.

13 Claims, 4 Drawing Sheets

(56) References Cited

U.S. PATENT DOCUMENTS

| | | | | |
|---|---|---|---|---|
| 2,879,783 | A * | 3/1959 | Taplin | G05D 16/0672 137/116.5 |
| 3,252,471 | A * | 5/1966 | Olson | F16K 31/126 137/270 |
| 3,420,257 | A * | 1/1969 | Lansky | G05D 16/0663 137/116.5 |
| 3,926,204 | A * | 12/1975 | Earl | G05D 16/02 137/116.5 |
| 3,944,294 | A * | 3/1976 | Masuda | B60T 8/1831 137/596.18 |
| 3,996,955 | A * | 12/1976 | Kawabata | G05D 16/0663 123/406.69 |
| 4,208,031 | A | 6/1980 | Jonak | |
| 4,452,267 | A * | 6/1984 | Ott | G05D 16/2026 137/116.5 |
| 4,724,859 | A * | 2/1988 | Nakao | B60T 11/34 137/116.5 |
| 4,776,368 | A | 10/1988 | Drozd | |
| 4,898,200 | A * | 2/1990 | Odajima | F15B 5/003 137/116.5 |
| 4,966,183 | A * | 10/1990 | Williamson, Jr. | G05D 16/0663 137/116.5 |
| 5,307,834 | A * | 5/1994 | Tatarek-Gintowt | G05D 16/10 137/116.5 |
| 5,370,152 | A * | 12/1994 | Carey | G05D 16/2093 137/116.5 |
| 5,595,209 | A * | 1/1997 | Atkinson | G05D 16/0672 137/116.5 |
| 5,931,182 | A * | 8/1999 | Craft | G05D 16/10 137/116.5 |
| 6,019,121 | A * | 2/2000 | Uehara | G05D 16/0672 137/116.5 |
| 6,068,014 | A * | 5/2000 | Tomita | G05D 16/0666 137/116.5 |
| 7,192,665 | B2 * | 3/2007 | Nakajima | F16K 17/196 123/463 |
| 8,104,740 | B2 * | 1/2012 | Igarashi | F16K 31/1268 251/331 |
| 8,485,213 | B2 * | 7/2013 | Hawkins | F16K 17/105 137/116.5 |
| 2004/0065368 | A1 * | 4/2004 | Larsen | F16K 31/363 137/492.5 |

* cited by examiner

DEVICE FOR PROVIDING A FLUID HAVING REGULATED OUTPUT PRESSURE

CROSS-REFERENCE TO A RELATED APPLICATION

The invention described and claimed hereinbelow is also described in European Patent Application 14 161 000.6, filed on Mar. 21, 2014. The European Patent Application, the subject matters of which is incorporated herein by reference, provides the basis for a claim of priority of invention under 35 U.S.C. 119(a)-(d).

BACKGROUND OF THE INVENTION

The present invention relates to a device for providing a fluid having regulated output pressure. The device comprises a pressure control unit that is controlled via a pilot control pressure and comprises an inlet chamber for the fluid having an input pressure, an outlet chamber for the fluid having the regulated output pressure and a first valve unit that acts between the inlet chamber and the outlet chamber and comprises a pilot control unit that provides the pilot control pressure.

Highly accurate pressure controllers having an accuracy greater than 1% and, often, greater than 0.5%, are required for use in test devices and in special machines, which cannot be achieved by the known devices or cannot be achieved with sufficiently low energy consumption.

In addition, the regulation in the case of the known devices is associated with a notable frictional force and therefore has a regulation hysteresis. Furthermore, the known devices are susceptible to fluctuating input pressure.

In addition, the switching noises of known devices are often perceived as being disadvantageous.

In the case of the known devices, it is furthermore disadvantageous that the output pressure often must remain noticeably lower than the input pressure, which is likewise disadvantageous in terms of energy.

SUMMARY OF THE INVENTION

The present invention overcomes the shortcomings of known arts, such as those mentioned above.

To that end, the present invention provides a device that enables precise mechanical pressure regulation.

In an embodiment, the invention embodies a device for providing a fluid having regulated output pressure. The inventive device includes a pressure control unit comprising a first diaphragm, onto which a pilot control pressure acts and a second diaphragm, which is mechanically coupled to the first diaphragm, onto which a fluid having an output pressure acts. At least the second diaphragm mechanically acts on the first valve unit.

Given that the pressure control unit has a double-diaphragm design comprising a first and a second diaphragm, precise mechanical pressure control is made possible, since the output pressure can be regulated to within a few mbar of the input pressure.

Moreover, the pilot control pressure can be converted into the output pressure nearly 1:1, wherein the regulation takes place with minimal frictional force and, therefore, has very low hysteresis.

In this connection, the first and the second diaphragm preferably each have an effective pressure surface, wherein the pressure surface of the first diaphragm is at least the same size as the effective pressure surface of the second diaphragm.

This measure, in particular, results in the aforementioned precise mechanical pressure control.

It is further preferable to dispose at least one compensation element having a pressure-dependent compensation force in the inlet chamber.

The advantage of this measure is that the output pressure can be regulated largely independently of the input pressure, thereby making is possible to compensate not only for fluctuations in the input pressure itself but also for such pressure fluctuations in the inlet chamber, which result from the different opening or closing of the first valve unit, i.e., the regulation of the output pressure.

To this end, a metallic bellows is preferably used for the compensation of the cross-sectional area of the valve seat of the first valve unit, which compensates for pressure fluctuations by the fluid or the valve seat of the first valve unit.

In general, the first valve unit comprises a closing piston disposed in the outlet chamber and a valve seat that interacts with the closing piston and fluidically connects the inlet chamber to the outlet chamber. A control tube, which is mounted to be longitudinally displaceable, is provided for opening the first valve unit and is disposed between the second diaphragm and the first valve unit. The first valve unit comprises a closing spring that presses the closing piston against the valve seat.

The advantage of these measures is that the first valve unit is slightly preloaded in the closing direction by the output pressure, wherein the closing spring, which acts on the closing piston in the same manner as the output pressure, enables mechanically precise regulation possible even at very low pressures.

In addition, the control tube preferably establishes a permanent fluidic connection between the outlet chamber and a coupling chamber, which is adjacent to the second diaphragm.

The advantage of this measure is that the output pressure acts on a large surface area of the second diaphragm, i.e., the output pressure is not guided merely via the control tube centrally onto the second diaphragm, thereby enabling regulation that has low friction and is mechanically very precise.

When the pilot control pressure is made available in a pilot control volume that acts on the first diaphragm in a planar manner, the thusly designed double-diaphragm pressure controller enables precise mechanical pressure control due its large surfaces onto which pressure is applied.

The closing piston is preferably disposed on the control tube and the control tube is preferably mounted in a holding part, preferably by an upper sliding bearing, and is mounted in a guide piece, preferably by means of a lower sliding bearing.

The mechanically simple design is advantageous in that slight mechanical friction is generated in the valve mechanics by the use of sliding bearings instead of O-ring seals.

An intermediate space having a fluidic connection to a ventilation opening is provided between the first and the second diaphragm. The advantage of this diaphragm is that overpressure or underpressure cannot develop between the two diaphragms, because the intermediate space is used for ventilation, which would adversely affect or at least delay the regulation.

The device preferably comprises a second valve unit for ventilating the outlet chamber, wherein the second valve unit acts between the coupling chamber and a ventilation opening. The second valve unit has a ventilation seat disposed between the second diaphragm and the control tube, which fluidically connects the intermediate chamber to the coupling chamber and interacts with a sealing surface on the control tube. A ventilation spring is provided that is disposed between the ventilation seat and a holding part for the control tube. This measure makes it possible, in a mechanically simple manner, to ventilate the device in the event that the pilot control pressure is reduced, in order to provide a lower output pressure.

The ventilation spring is used not only for reliable ventilation, but also for force displacement, thereby ensuring that output pressures in the underpressure range can also be regulated by means of pilot control pressures in the overpressure range.

The pilot control unit for generating the pilot control pressure preferably comprises at least two electrically controlled proportional valves. The first proportional valve is provided for increasing the pilot control pressure and the second proportional valve is provided for reducing the pilot control pressure. The pilot control unit preferably comprises at least one more valve, which is electrically controlled via a control voltage and brings about a predefined state of the device in the event the control voltage fails.

As compared to switching valves, the use of two proportional valves enables sensitive electronic regulation of the pilot control pressure and results in considerable noise reduction and energy savings, since the proportional valves need to be only partially energized.

The third valve engages only in the event of an interruption of the supply voltage or a failure of control signals, i.e., in the event of failure of control voltages in general, and ensures that a predefined state is achieved, which is usually a ventilated, secure valve state, in which the output pressure is 0 bar.

The pilot control valves and the third valve are activated by digital electronics, which regulate the output pressure by up to three pressure sensors. The pressure sensors measure the input pressure as well as the output pressure and the pilot control pressure and use these for the purpose of regulation.

The setpoint value for the control electronics is assigned via a digital network having appropriate bus connections.

In all, the inventive device enables highly accurate and low-power pressure control, which is made possible not only by the large, effective pressure surfaces of the two diaphragms, but also by the low-friction arrangement of the individual valve parts.

The two or, optionally, three movable elements, i.e., the two diaphragms and, optionally, the metallic bellows, are used for sealing and in order to build up the pressure force. O-ring seals are not absolutely necessary for the movable parts.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
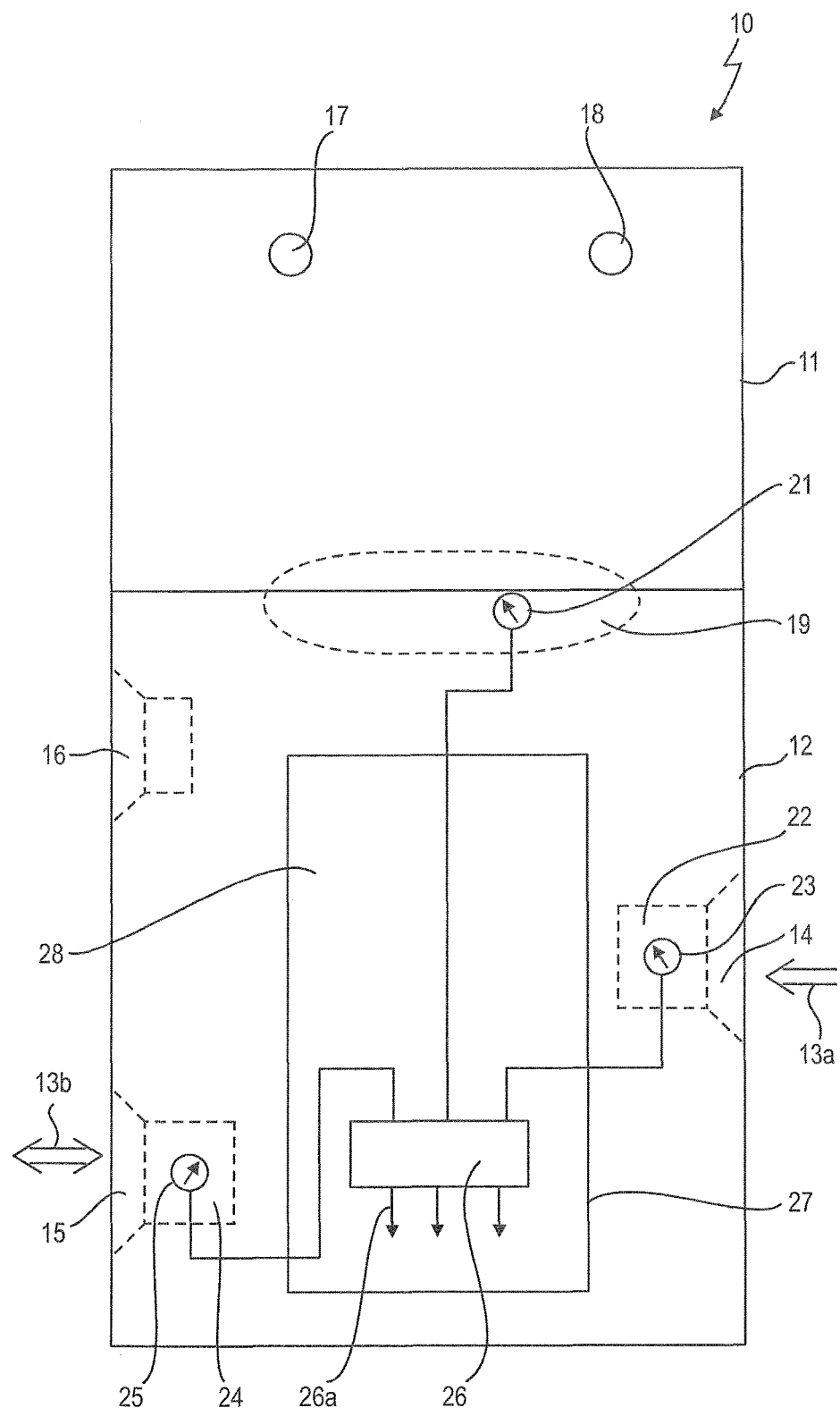
FIG. 1 presents a schematic front view of the inventive.

FIG. 1 presents a schematic front view of a device 10 for highly accurate and low-power pressure control. Device 10 comprises a pilot control valve 11 and a pressure control unit 12. The pilot control unit 11 and the pressure control unit 12 each have a housing, wherein the two housings are interconnected in a manner that is not shown.

The device 10 is used for the pressure regulation of a fluid 13a having an input pressure. The fluid 13a is introduced into the pressure control unit 12 at an inlet opening 14 and, after appropriate pressure regulation, is present at an outlet opening 15 as fluid 13b having an output pressure.

Furthermore, a ventilation opening 16 is provided, which is used to expel fluid under pressure in the device 10, e.g., during shut-off or if a fault condition occurs.

A connector 17, as the pilot control inlet, and a connector 18, as the pilot control outlet, are indicated in the pilot control unit 11. Via these connectors 17, 18, a fluid having a pilot control pressure 20 is provided in a pilot control volume 19 at the boundary between the pilot control unit 11 and the pressure control unit 12, by which pilot control pressure 20 the output pressure of the fluid 13b is set.

The pilot control pressure 20 is detected by means of a pressure sensor 21.

The inlet opening 14 leads into an inlet chamber 22, in which the pressure of the inflowing fluid 13a, i.e., the input pressure, and the fluctuations thereof resulting from the regulation, which is described in the following, are detected by pressure sensor 23.

The outlet opening 15 is connected to a working chamber 24, in which the output pressure of the fluid 13b is detected by means of a pressure sensor 25.

The three pressure sensors 21, 23, 25 send their pressure signals to a regulating unit 26, which outputs control voltages 26a that lead to electrically controlled valves, which are explained in the following with reference to FIG. 2.

The regulating unit 26 is part of a control unit 27, which also comprises a graphics display 28, on which control signals, error messages, etc., can be shown and, optionally, on which setpoint values are entered.

Figure 2:
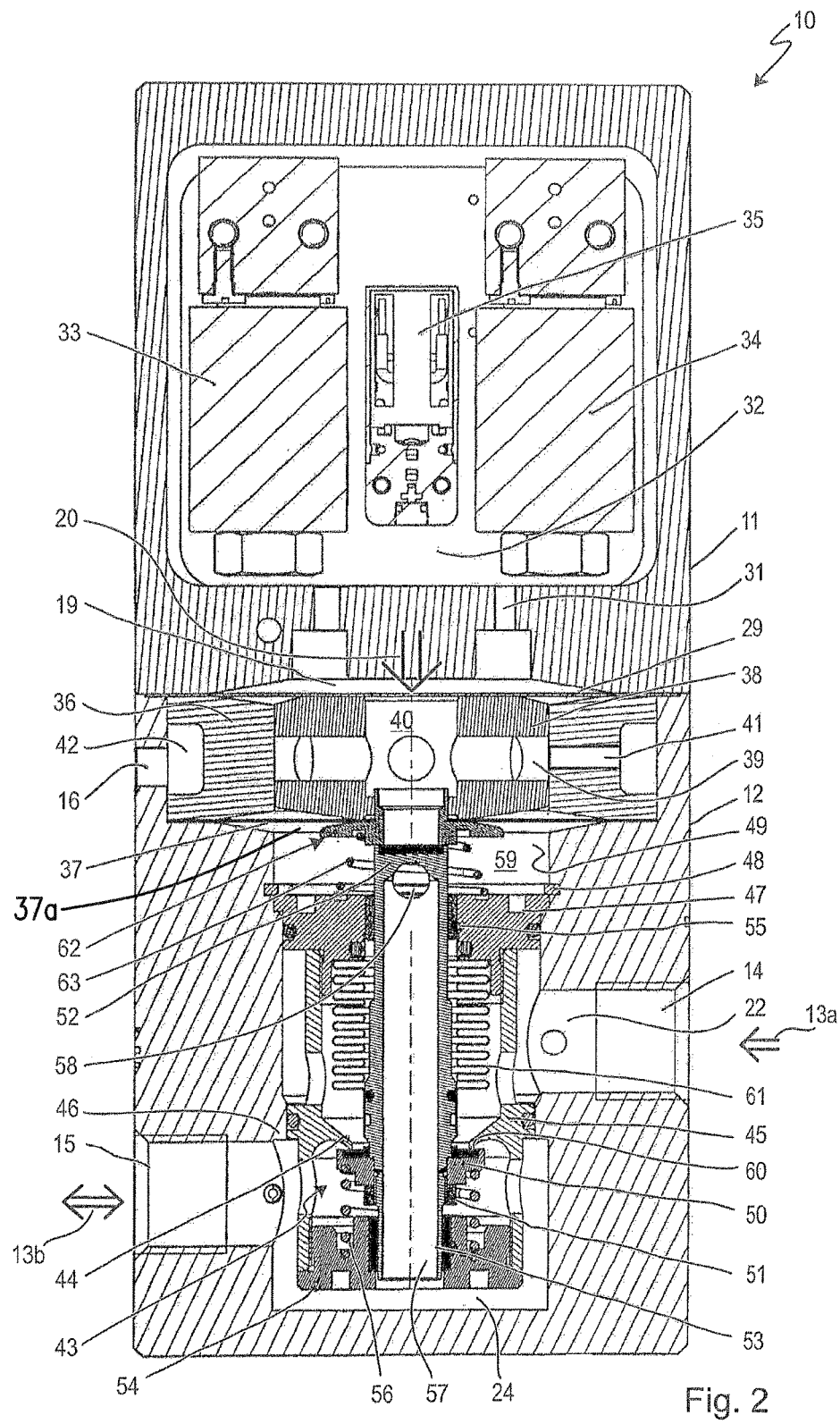
FIG. 2 presents a schematic longitudinal view through the device from FIG. 1.

In the sectional view shown in FIG. 2, it is evident that the pilot control pressure 20, in the pilot control volume 19, acts on an upper diaphragm 29, the effective pressure surface 30 (FIG. 3) of which is disposed opposite the pilot control volume 19 via a large surface area thereof.

The upper diaphragm 29 is fixedly clamped, at the edges thereof, between the pilot control unit 11 and the pressure control unit 12.

The pilot control volume 19 is connected to an inner chamber 32 of the pilot control unit 11 via channels and openings 31. Two proportional valves 33 and 34 as well as a safety valve 35 are disposed in the inner chamber 32.

The proportional valve 33 is a 2/2 NC ventilation valve, the proportional valve 34 is a 2/2 NC ventilation valve and the safety valve 35 is a 2/2 NC or 2/2 NO switching valve. The proportional valves 33, 34 are used to increase or decrease the pilot control pressure 20 in the pilot control volume 19 depending on which output pressure must be set for which input pressure of the fluid 13.

In the event that the control signals 26a or the power supply fail due to a technical fault, the two proportional valves 33 and 34 close, while the safety valve 35 switches such that the pressure in the inner chamber 32 and, via the channels 31, the pilot control pressure 20 in the pilot control volume 19 can be changed.

The upper diaphragm 29 covers a cylindrical chamber in the pressure control unit 12, in which a cylindrical pressure piece 36 is located, which presses a lower diaphragm 37 onto a shoulder in the pressure control unit 12.

If the pilot control unit 11 and the pressure control unit 12 are fixedly interconnected, the pressure piece 36 therefore presses the upper diaphragm 29 against an annular surface on the pilot control unit 11 and simultaneously presses the lower diaphragm 37 against an annular shoulder in the interior of the pressure control unit 12.

A mechanical movement coupler 38 is disposed between the two diaphragms 29, 37 and mechanically couples the movement of the two diaphragms to one another.

Ventilation channels 39 are provided in the movement coupler 38, which are fluidically connected to ventilation channels 41 and an annular channel 42 on the pressure piece 36, thereby enabling an intermediate space 40 between the two diaphragms 29 and 37 to be ventilated or connected to underpressure via the ventilation opening 16.

As shown at the bottom of FIG. 2, a first valve arrangement 43 is provided in a blind hole in the pressure control unit 12, via which the inlet chamber 22 and the outlet chamber 24 can be selectively brought into a fluidic connection with one another, wherein the extent of opening of the valve arrangement 43 can be changed in a proportional manner.

The valve arrangement 43 comprises a valve seat 44, which is formed within a sleeve 45, which is supported between an annular shoulder 46 in the pressure control unit 12 and a holding part 47 disposed at the top in FIG. 2. The holding part is held by a holding ring 48 in a stepped bore 49, which extends through the pressure control unit 12, as a blind hole.

The first valve arrangement 43 further comprises a closing piston 50, which is disposed in the outlet chamber 24 and is fastened on a longitudinally displaceable control tube 52 via a nut 51. The control tube 52 is supported in a sliding bearing 53 in a lower guide piece 54, which is located underneath the closing piston 50, and in an upper sliding bearing 55 in the holding part 47, thereby enabling the control tube to execute a low-friction stroke.

A closing spring 56 is disposed between the guide piece 54 and the closing piston 50. The closing spring presses the closing piston 50 against the valve seat 44.

A central blind hole 57, which is open toward the outlet chamber 24, is provided in the control tube 52 and, at the top, leads into transverse holes 58. Transverse holes 58 lead into a coupling chamber 59, which rests against the lower diaphragm 37 and, there, acts upon the entire effective pressure surface 37a thereof with fluid 13b having output pressure.

It should also be noted that a sealing surface 60 is provided between the valve seat 44 and the closing piston 50. The sealing surface ensures that the first valve arrangement 43 is securely closed.

A metallic bellows 61 is provided in the inlet chamber 22, between the guide piece 54 and the holding part 47. Pressure fluctuations in the inlet chamber 22 induced by a fluctuating input pressure of the fluid 13a and/or by a varying extent of opening of the first valve unit 43 are compensated for by the surface differential of the metallic bellows.

Figure 3:
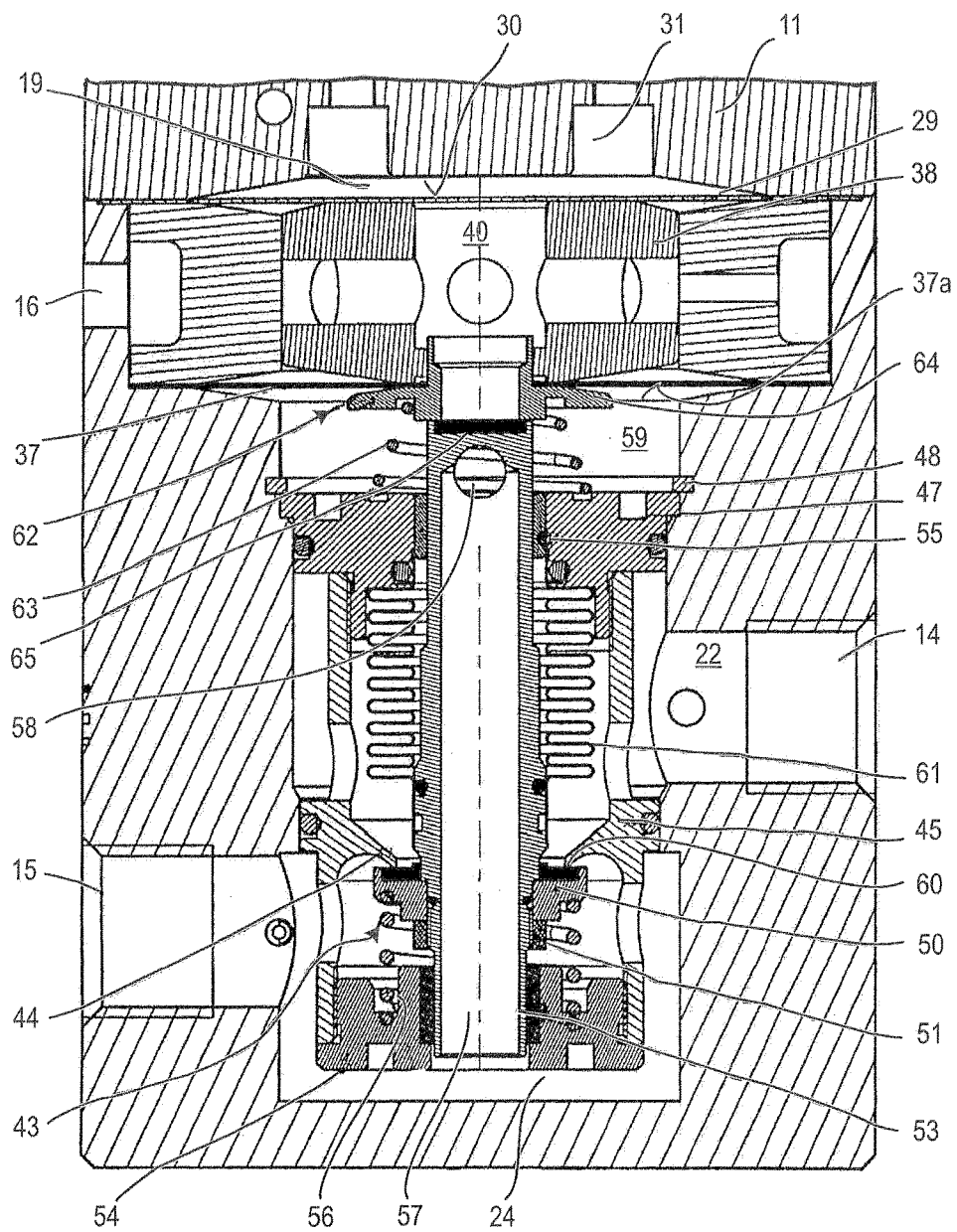
FIG. 3 presents an enlarged depiction of the pressure control unit of the device from FIG. 2.

A second valve arrangement 62 is disposed between the intermediate space 40 and the coupling chamber 59 and is acted upon, in the opening direction, by a ventilation spring 63, as will now be explained further with reference to FIG. 3.

The second valve arrangement 62 comprises a ventilation seat 64 formed as a disk-shaped part having a pin and a passage hole. The passage hole is closed by a sealing surface 65 on the end face of the control tube 53 when the first valve unit 43 is at least partially open.

Figure 4:
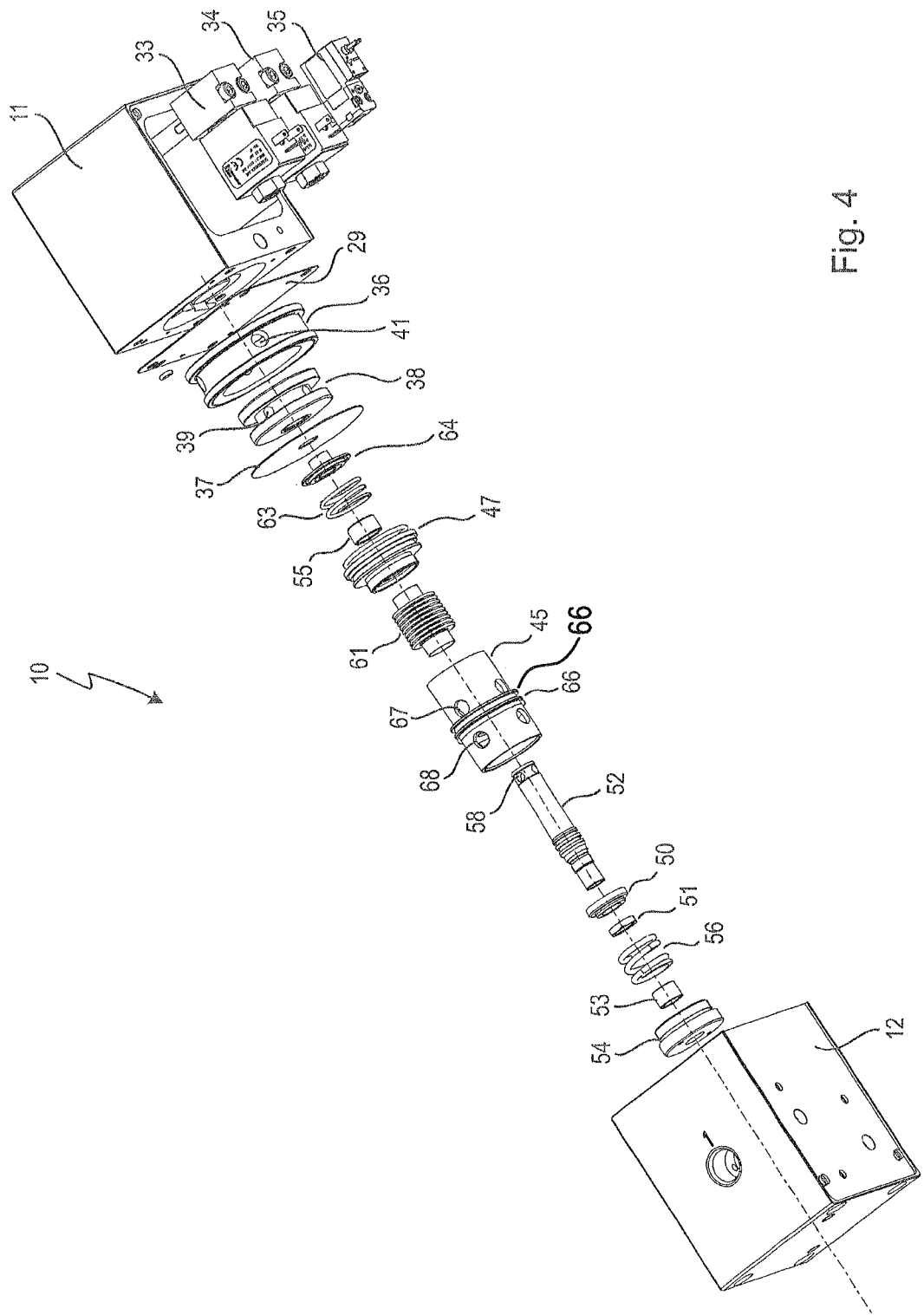
FIG. 4 presents an exploded depiction of the device according to FIG. 2.

In FIG. 4, the device 10 from FIG. 2 is shown in a schematic exploded depiction from the side, wherein it is evident here, in particular, that the sleeve 45 has two annular ring beads 66, which are supported against the annular shoulder 46 in the stepped bore 49.

It is furthermore evident that the sleeve 45 has upper transverse openings 67, which are located in the inlet chamber 22, and lower transverse openings 68, which are located in the outlet chamber 24.

When the device 10 is activated such that a fluid 13a having an input pressure is directed into the inlet chamber 22 and a pilot control pressure 20 is built up in the pilot control volume 19, the upper diaphragm 29 presses onto the lower diaphragm 37 and the valve seat 64 via the movement coupler 38. Consequently, the control tube 52 is moved downward such that the closing piston 50 is released from the valve seat 44 against the force of the closing spring 56, and therefore a fluidic connection is established between the inlet chamber 22 and the outlet chamber 24.

The fluid 13b collecting in the outlet chamber 24 travels through the blind hole 57 and the transverse holes 58 into the coupling chamber 59. The fluid therefore acts on the effective pressure surface 37a of the lower diaphragm 37. In this manner, a fluid 13b having an adjustable output pressure is available in the outlet chamber in a sensitive manner, and is regulated via the pilot control pressure 20.

Pressure fluctuations in the supplied fluid 13a or changes in the extent of opening of the first valve unit 43 results in pressure fluctuations in the inlet chamber 22. These pressure fluctuations are largely compensated for by the surface differential of the metallic bellows 61, and therefore secondary control via the pilot control pressure 20 is required only in the event of relatively great pressure fluctuations. In other words, the proportional valves 33 and 34 are usually not supplied with current and, in accordance with the control curve thereof, are supplied with current only when there is a need to increase or decrease the pilot control pressure 20 in the pilot control volume 19.

Given very low output pressures, which can even be in the underpressure range, it is still possible to operate with a pilot control pressure 20, which is in the overpressure range, because the two springs 56 and 62 provide a corresponding counteracting force. The corresponding counteracting force cannot be applied by the fluid itself onto the effective pressure surface 37a in the event of an underpressure.

For the case in which the regulating unit 26 or the power supply fails, i.e., control signals 26a can no longer be supplied, the two proportional valves 33 and 34 close, since these are closed in the non-operative state (NC=Normally Closed).

The valve 35, which is open, e.g., in the non-operative state (NO=Normally Open), switches at the same time such that the inner chamber 32 and the pilot control volume 19, as well as the coupling chamber 59 and the outlet chamber 24 are ventilated immediately if there is a power failure or any other type of mechanical failure.

When the inner chamber 32 is ventilated, the pilot control volume 19 also is initially ventilated such that the pilot control pressure 20 is eliminated and the closing spring 46 presses the control tube 52 upward to the point at which the first valve unit 43 is closed and the second valve unit 62 opens.

The ventilation spring 63 then presses the ventilation seat 64 (and, therefore, the movement coupler 38 and the upper diaphragm 29) further upward such that the ventilation seat is released from the sealing surface 65.

In this manner, a fluidic connection is established between the intermediate space 40 and the coupling chamber 59, which also is connected to the outlet chamber 24 in the manner described. The outlet chamber 24 therefore also enters into a fluidic connection with the intermediate space 40 via the blind hole 57.

Since the intermediate chamber 40 is fluidically connected to the ventilation opening 16, this procedure also results in a complete ventilation of the pressure control unit 12.

If there is a power failure or any other type of technical error, both the pilot control unit 11 and the pressure control unit 12 therefore transition into a predefined, safe state.

The device 10 therefore functions as a 3/3 NC pressure control valve having an adjusted position, in which both valve units 43, 62 are closed.

If the setpoint value is increased, the proportional valve 33 is actuated and the pilot control pressure 20 is increased, whereupon the first valve unit 43 is actuated and the output pressure increases. Once the output pressure reaches the pilot control pressure, the valve unit 43 closes again.

If the setpoint value is reduced, the proportional valve 34 is actuated and the pilot control pressure 20 is decreased, whereupon the second valve unit 62 is actuated and the output pressure decreases. Once the output pressure reaches the pilot control pressure, the valve unit 62 closes again.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A device for providing an output fluid at a regulated output pressure, the device comprising:
    a pressure control unit controlled via a pilot control pressure and comprising an inlet chamber for an input fluid having an input pressure, an outlet chamber for the output fluid at the regulated output pressure and a first valve unit configured to act between the inlet chamber and the outlet chamber;
    a control tube; and
    a pilot control unit that provides the pilot control pressure,
    wherein the pressure control unit further comprises a first diaphragm onto which the pilot control pressure acts and a second diaphragm, mechanically coupled to the first diaphragm, onto which the output fluid having the output pressure acts;
    wherein at least the second diaphragm acts mechanically on the first valve unit;
    wherein the first valve unit comprises a closing piston disposed in the outlet chamber and a valve seat configured to interact with the closing piston and wherein the valve seat fluidically connects the inlet chamber to the outlet chamber;
    wherein the control tube extends away from the second diaphragm, in a direction of the first valve unit for a longitudinal distance at least equal to a longitudinal distance between the second diaphragm and the first valve unit;
    wherein the control tube is configured to be longitudinally displaceable for opening the first valve unit; and
    wherein the control tube establishes a permanent fluidic connection between the outlet chamber and a coupling chamber arranged in the pressure control unit adjacent to the second diaphragm.

2. The device according to claim 1, wherein the first diaphragm and the second diaphragm have a first effective pressure surface and a second effective pressure surface, respectively, and wherein the first effective pressure surface is at least as large as or is larger than the second effective pressure surface.

3. The device according to claim 1, wherein the pressure control unit further comprises at least one compensation element having a pressure-dependent compensation force disposed in the inlet chamber.

4. The device according to claim 1, wherein the first valve unit comprises a closing spring that presses the closing piston against the valve seat.

5. The device according to claim 1, wherein the closing piston is disposed on the control tube.

6. The device according to claim 1, wherein the control tube is supported in a holding part via an upper sliding bearing and is additionally supported in a guide piece via a lower sliding bearing.

7. The device according to claim 1, wherein an intermediate space is fluidically connected to a ventilation opening and is provided between the first diaphragm and the second diaphragm.

8. The device according to claim 1, further comprising a second valve unit for ventilating the outlet chamber.

9. The device according to claim 1, wherein the second valve unit acts between the coupling chamber and a ventilation opening.

10. The device according to claim 9, wherein the second valve unit comprises a ventilation seat disposed between the second diaphragm and the control tube that fluidically connects the intermediate space to the coupling chamber and interacts with a sealing surface on the control tube.

11. The device according to claim 10, wherein the second valve unit comprises a ventilation spring disposed between the ventilation seat and a holding part for the control tube.

12. The device according to claim 1, wherein the pilot control unit comprises a first electrically controlled proportional valve and a second electrically controlled proportional valve for generating the pilot control pressure, wherein the first proportional valve increases the pilot control pressure and the second proportional valve reduces the pilot control pressure.

13. The device according to claim 1, wherein the pilot control unit comprises at least one safety valve electrically controlled via a control voltage for effecting a predefined state of the device in the event of failure of the control voltage.

* * * * *